US007942651B2

(12) United States Patent
Bin-Nun et al.

(10) Patent No.: US 7,942,651 B2
(45) Date of Patent: May 17, 2011

(54) REFRIGERATION DEVICE WITH IMPROVED DC MOTOR

(75) Inventors: Uri Bin-Nun, Chelmsford, MA (US); Daniel L. Manitakos, Boxford, MA (US)

(73) Assignee: FLIR Systems, Inc., Wilsonville, OR (US)

( * ) Notice: Subject to any disclaimer, the term of this patent is extended or adjusted under 35 U.S.C. 154(b) by 95 days.

(21) Appl. No.: 12/079,488

(22) Filed: Mar. 27, 2008

(65) Prior Publication Data
US 2008/0247889 A1 Oct. 9, 2008

Related U.S. Application Data

(62) Division of application No. 10/830,630, filed on Apr. 23, 2004, now Pat. No. 7,377,035.

(51) Int. Cl.
F04B 17/03 (2006.01)
H02K 7/02 (2006.01)
H02K 5/04 (2006.01)

(52) U.S. Cl. ............ 417/415; 310/74; 310/89; 310/153; 310/216.066

(58) Field of Classification Search .................. 417/415; 310/153, 74, 89, 156.45, 216.066
See application file for complete search history.

(56) References Cited

U.S. PATENT DOCUMENTS

| | | | | |
|---|---|---|---|---|
| 3,269,322 A | * | 8/1966 | Lotspih | 417/423.3 |
| 4,306,419 A | * | 12/1981 | Schwartz | 62/6 |
| 4,363,984 A | * | 12/1982 | Torii et al. | 310/156.12 |
| 4,550,571 A | * | 11/1985 | Bertsch | 62/6 |
| 4,577,549 A | | 3/1986 | Frank et al. | |
| 4,670,089 A | | 6/1987 | Hanson | |
| 4,858,422 A | | 8/1989 | Stahlecker | |
| 4,979,368 A | | 12/1990 | Stetson | |
| 5,056,317 A | | 10/1991 | Stetson | |
| 5,102,313 A | * | 4/1992 | Szabo | 417/572 |
| 5,723,923 A | * | 3/1998 | Clagett | 310/74 |
| 6,007,642 A | * | 12/1999 | Gallo | 148/111 |
| 6,076,358 A | | 6/2000 | Bin-Nun | |
| 6,230,498 B1 | * | 5/2001 | Bin-Nun et al. | 62/6 |
| 6,751,842 B2 | * | 6/2004 | Roesel et al. | 29/598 |
| 2006/0181168 A1 | * | 8/2006 | Hargraves et al. | 310/90 |

* cited by examiner

Primary Examiner — Charles G Freay
(74) Attorney, Agent, or Firm — The H.T. Than Law Group

(57) ABSTRACT

A miniature cooling device includes numerous improvements capable of increasing the reliability and useful lifetime of the device, as well as improving electrical power to cooling power conversion efficiency. The improvements include a DC motor shaft design that incorporates a flywheel mass 314 with a solid shaft cross-section 300 for increasing shaft stiffness and magnetic flux density in the DC motor. Additional improvements include a bend resistant flexible vane 1114 in the DC motor to compression piston drive coupler, and a sealed cover set configured to be removable to make a motor repair and then replaced.

13 Claims, 14 Drawing Sheets

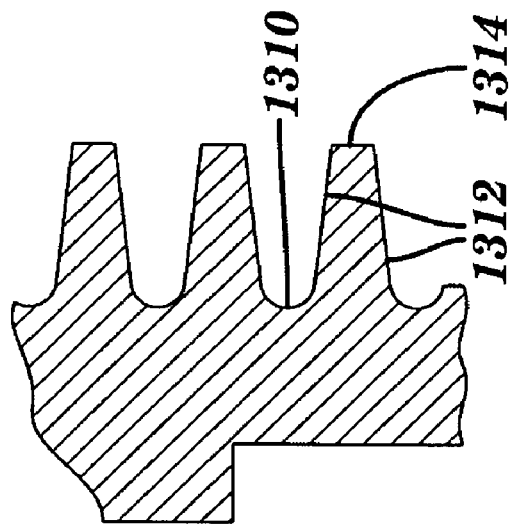
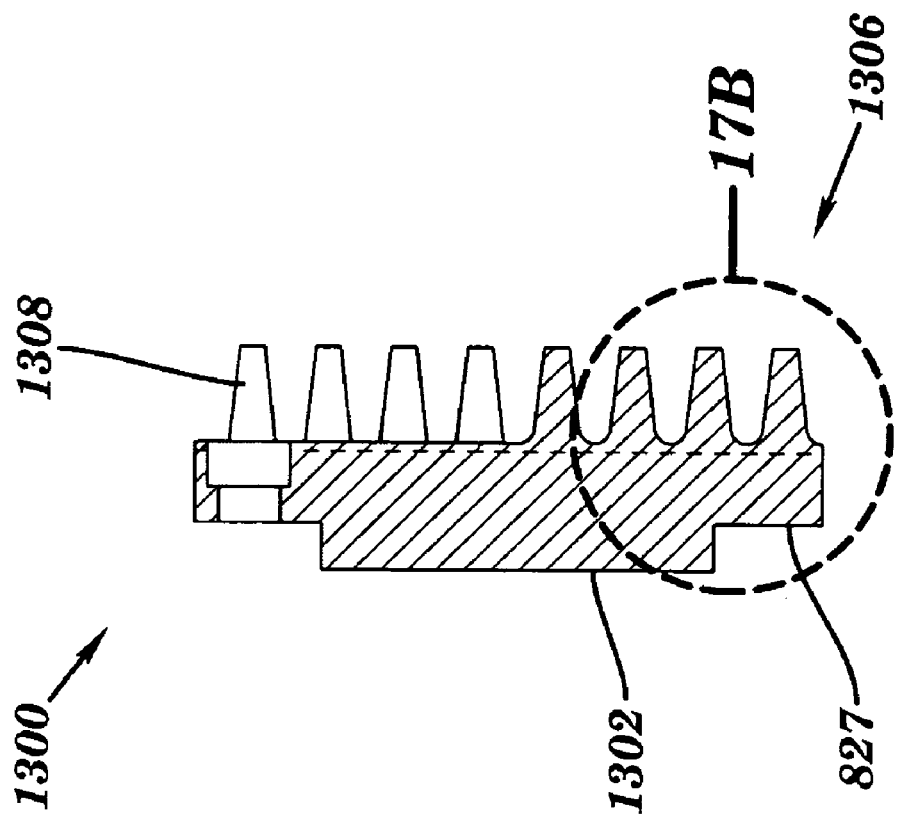

REFRIGERATION DEVICE WITH IMPROVED DC MOTOR

CROSS REFERENCE TO RELATED APPLICATIONS

This application is a divisional filing of U.S. patent application Ser. No. 10/830,630 by Bin-Nun et al. filed on Apr. 23, 2004, now U.S. Pat. No. 7,377,035 entitled IMPROVED REFRIGERATION DEVICE WITH IMPROVED DC MOTOR and claims the benefit of priority thereof. U.S. patent application Ser. No. 10/830,630 is incorporated herein in its entirety.

BACKGROUND OR THE INVENTION

1. Field of the Invention

The invention provides an improved miniature refrigeration system or cryocooler for cooling an element to a cryogenic temperature, e.g. less than 200° K but usually 77° K or below, and for maintaining the element at the cooled temperature for an extended period. In particular, the invention provides improvements to a DC motor used to drive a refrigeration gas compressor, improvements to the refrigeration gas compressor and improvements to elements of the drive coupling between the DC motor and a compressor piston and a regenerator piston.

2. Description of the Prior Art

Miniature refrigeration devices based on the Stirling-cycle are used in infrared (IR) imaging systems to maintain an IR detector at a constant cryogenic temperature during operation. Miniature refrigeration devices may also be used in other fields, e.g. for maintaining superconductive materials at a constant cryogenic temperature during operation. However, the improvements described herein are more generally a crank pin extending from an end face of the drive shaft parallel to the rotation axis and rotating eccentrically about the rotation axis. A drive coupling attached to the crank pin moves eccentrically about the shaft rotation axis generating linear motion for driving the compressor and regenerator pistons along a linear path. A flexible vane is linked between the drive coupling and each of the compression and regenerator pistons. Each flexible vane comprises a flat thin flexible spring constrained at its end by the drive coupling and a clamp on the piston being driven. During operation, each flexible vane bends along its longitudinal axis as it pushes and draws each piston reciprocally along the linear axis formed by the corresponding compression and regenerator cylinders. One mode of catastrophic cryocooler failure occurs when a flexible vane fractures or is bent beyond the yield limit of the material and becomes permanently bent. Such a failure may occur when a piston stalls within a cylinder. Other flexible vane failures may occur when misalignment of the vane may induce twisting and in-plane bending, perpendicular to the desired bend axis, during each cycle. This condition can eventually lead to fatigue failure in the flexible vane. Flexible vane failures usually occur when bending and or more complex stresses exceed the fracture or yield stress limit of the material. This usually occurs at stress concentration areas such as at sharp corners, holes or at locations where the vane is constrained.

As detailed in Stetson, the compression strokes of the compression and regenerator pistons occur 90° out of phase. In addition, the compression piston and regenerator piston each require a different linear drive force. Accordingly, the torque load on the DC motor is continuously varying during each rotation of the drive shaft. This causes the motor shaft to bend and applies non-uniform loading to the motor bearing. As a result, shaft bending generates unwanted vibration and non-uniform bearing loads increase bearing wear. Both conditions ultimately reducing the useful life of the motor bearings and degrade the operational efficiency of the cryocooler system. Other problems of prior art cryocooler devices lead to a shortened useful life. In particular, the drive forces applied to compression and regenerator pistons are directed along a continuously varying force direction by the flexible vane. In particular, the piston drive forces are almost never applied along the piston motion axes. As a result, the force direction always tends to force the piston against the side wall of its corresponding cylinder. Accordingly, piston and cylinder mating surface wear eventually leads to an increased clearance in the gap between the piston and cylinder walls, piston vibration and audible noise. In addition the constant variation in force direction further increases the non-uniformity of the single rotation torque load required by the DC motor. All of these problems may contribute to a decrease in cooling power; an increase in electrical power used, and heat generation within the motor, compressor and regenerator. In addition, as a result of wear and degradation of individual components, the operating efficiency of the cryocooler tends decrease over its operating life and may ultimately lead to premature system failure. In life tests of prior art cryocooler devices, the most common failure modes were found to be failed motor bearings, excessive piston to cylinder clearance, and bent or fractured flexible vanes. In general, as the system components continue to wear high temperature operation, lubrication breakdown, cold welding between moving elements, contaminants, and excess play between moving elements all tend to accelerate performance decline.

Since it is desirable to increase the operating efficiency, reliability and useful life of the cryocooler system and since the most common failure modes are motor bearing, piston to cylinder interface, and flexible vane failures, solutions for addressing these specific problems are addressed by the present invention.

Recently the demands of customers and an increase in competition in the market have provoked a desire to improve performance and the reliability of miniature refrigeration devices. In addition, new applications for miniature refrigeration devices in commercial markets have motivated manufacturers to attempt to lower prices in order to capture previously unavailable market share. With respect to miniature refrigeration device performance, reducing power consumption is a constant goal of designers since most miniature refrigeration units are battery operated or operated in systems that require strict power conservation, e.g. aircraft and space vehicles. Accordingly, there is a need in the art to improve the efficiency of converting electrical power to cooling power to extend battery life. There is also a need in other applications to provide higher cooling capacity and faster cool down times. In some critical imaging applications there is a need to reduce vibration. In general there is a need to improve the reliability of commercial cryocoolers and as the number of commercial applications increase there is a growing need to make system repairs, e.g. to replace worn motor bearing. The needs of the art detailed above are addressed in nearly every aspect of the present invention as will be understood after reading the detailed description.

Other market factors, especially the potential for capturing new commercial markets and the emergence of global competition, have provoked attempts to reduce the manufacturing cost of a miniature refrigeration device. Manufacturing costs are reduced by reducing the cost of materials and by reducing the cost of labor. Part and material cost reductions can be accomplished by eliminating parts and incorporating increased functionally into existing parts. Labor cost reduction may be reduced by eliminating assembly and process steps and especially those that require specialized labor skills. The need to reduce part count and labor is addressed in several aspects of the present invention as will be understood after reading the detailed description.

BRIEF SUMMARY OF THE INVENTION

The present invention overcomes the problems cited in the prior by providing improvements to a rotary DC motor 100 used to drive a Stirling cycle miniature refrigeration system capable of cooling an element to cryogenic temperatures. The improvements include an improved DC motor design that utilized an integral rotor shaft 300. In particular, the rotor shaft 300 is formed by a solid shaft portion 302 that is supported for rotation about a longitudinal rotation axis 306 of the motor e.g. by front rotary bearings 108 and rear rotary bearings 110. The rotor shaft further includes a hollow tubular shaped flywheel mass 314 disposed concentric with and radially distal from the rotation axis 306. The rotor shaft further includes a wall portion 316 radially disposed between the solid shaft portion 302 and the flywheel mass 314. The shaft portion 302, the wall portion 316 and the flywheel mass 314 are integrally formed as a unitary element made from a ferromagnetic material such as magnetically permeable 400 series stainless steel or low carbon steel such as 1018 series or any ferromagnetic material having a magnetic permeability in exec of about 600.

Preferably, the solid shaft portion 300 has a six-sided cross section formed substantially along most of its longitudinal length and provides six flat surfaces 304 for supporting six permanent magnets 112 thereon. Preferably each of the flat surfaces is formed with its normal axis substantially perpendicular with the rotation axis.

The DC motor further includes a removable exterior cover set formed by interlocking front 402 and rear 404 cup shaped hollow annular cover sections. Each cover section has a closed end formed with a feature 419 for attaching to a motor bearing 406 and 420 for attached to a motor bearing 410. The open ends of each of the front and rear cover sections are formed with annular male and female interlocking portions with interlocking features. The covers are interlocked and a first adhesive bond layer 424 is disposed between the annular male and the annular female interlocking portions over their entire circumference for providing a pressure seal and for mechanically fastening the cover sections together. The female interlocking portion 412 includes a circumferential marking feature 426 visible from the outside of the DC motor. The marking feature 426 marks a location for cutting through the female interlocking portion for making a motor repair. The male interlocking portion 408 includes a circumferential bonding recess 422 formed thereon for receiving the bonding layer therein.

In addition, the improved DC motor includes a buckle resistant flexible vane 1114 forming a drive link connected between the crank pin 114 at a driven end 1202 of the flexible vane and the compression piston at a drive end of the flexible vane for reciprocally driving the compression piston within the compression cylinder in response to eccentric rotation of the crank pin. The buckle resistant flexible vane 1114 comprises a flexible steel substrate having a substantially uniformly thickness and formed with the driven end 1202 wider than the drive end 1204 to increase the stiffness of the driven end with respect to the drive end.

BRIEF DESCRIPTION OF THE DRAWINGS

The features of the present invention will best be understood from a detailed description of the invention and a preferred embodiment thereof selected for the purposes of illustration and shown in the accompanying drawings in which:

FIG. 17A illustrates a section view taken through the improved compression head cover according to the present invention.

FIG. 17B illustrates an exploded view detailing heat dissipating fin protrusion formed on the improved compression head cover according to the present invention.

DETAILED DESCRIPTION OF THE INVENTION

Figure 1:
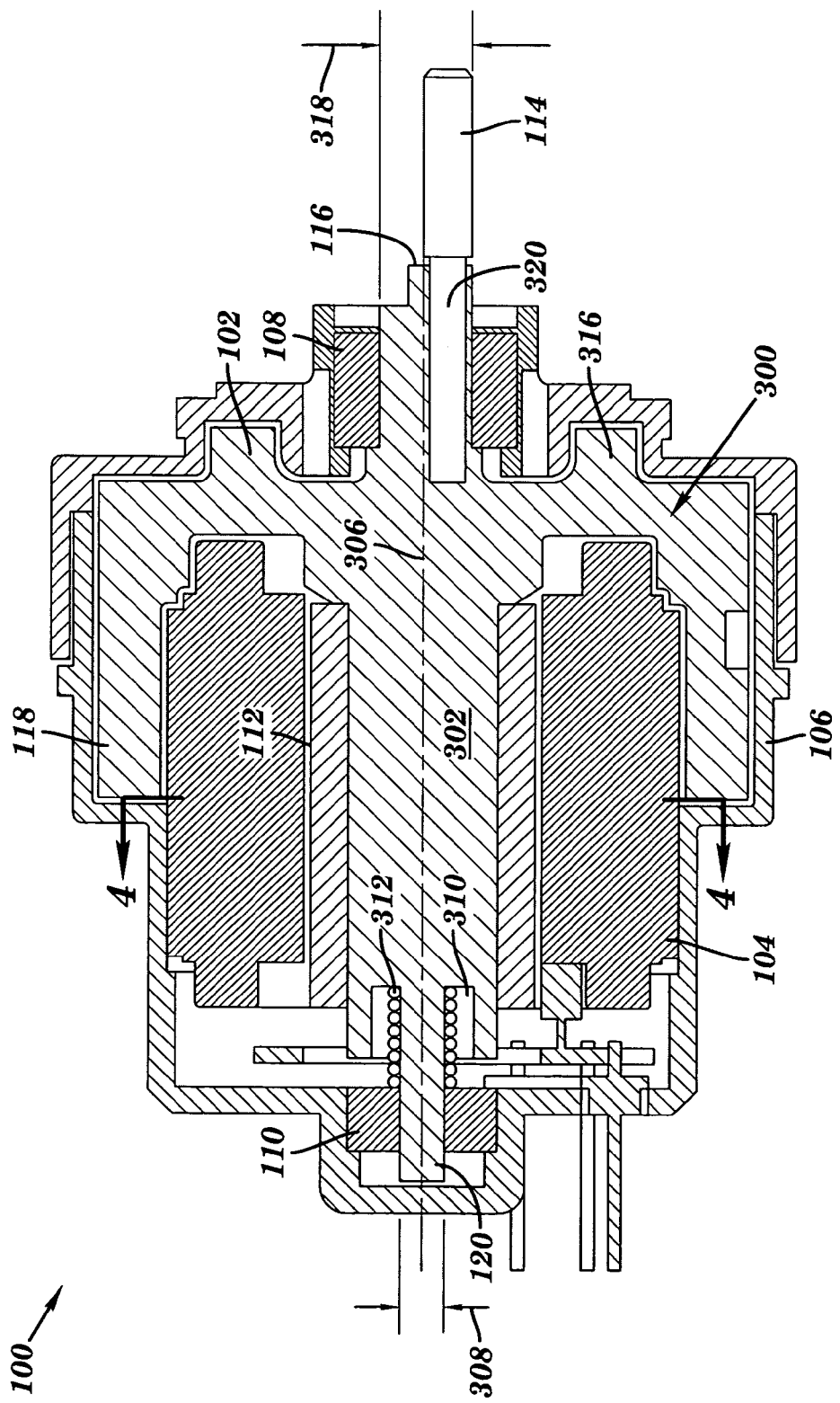
FIG. 1 illustrates an improved DC motor according to the present invention.
Figure 2:
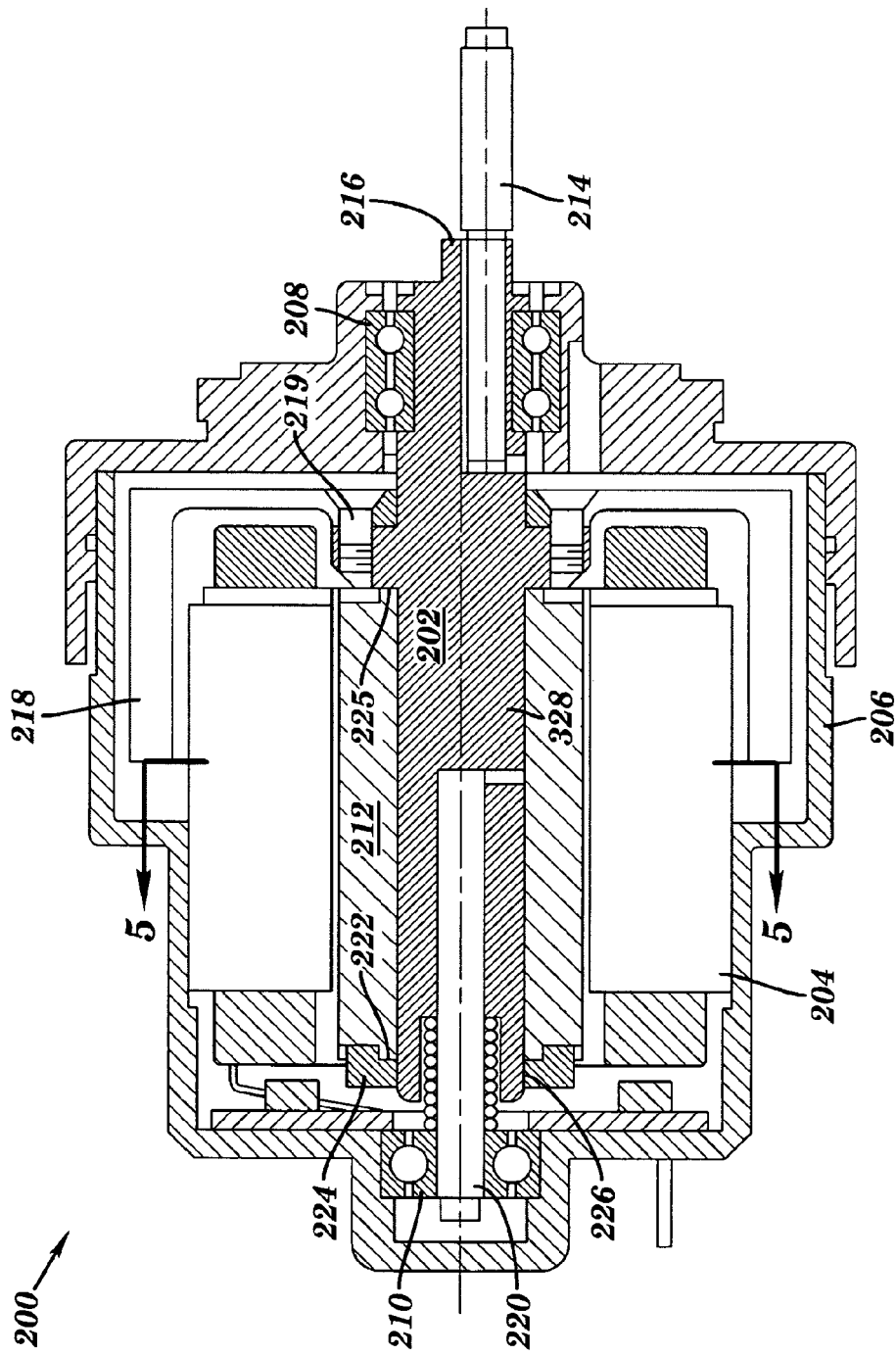
FIG. 2 illustrates one example of a conventional DC motor.

FIGS. 1 and 2 each depict a DC motor for use in a cryocooler system. The motor 100, detailed in FIG. 1, shows an improved DC motor according to the present invention. The motor 200, detailed in FIG. 2, shows one example of a DC motor of the prior art. Each of the motors (100, 200) includes a rotor assembly, (102, 202), a stator assembly, (104, 204), and a motor housing (106, 206). The motor housing (106, 206) supports the stator assembly (104, 204) in a fixed orientation while the rotor assembly (102, 202) is supported for rotation with respect to the motor housing (106, 206), and stator (104, 204), by bearings, indicated generally by front bearings (108, 208) and rear bearings (110, 210). Each rotor assembly includes a plurality of permanent magnets (112, 212) supported thereon, and rotatable therewith. A crank pin (114, 214) extends from a front face (116, 216) of the rotor assembly, parallel with a rotor rotation axis and rotates eccentrically about the rotation axis. During operation, the entire cryocooler, including the DC motor, are filled with the refrigeration gas, helium, at an elevated pressure, e.g. 200-300 pounds per square inch. Accordingly, any openings in the motor housing (106, 206) must be pressure sealed to prevent the gas from escaping.

Each rotor assembly also includes a flywheel portion (118, 218) for storing kinetic energy during rotation of the rotor assembly and for releasing kinetic energy in response to variations in rotor torque and rotational velocity. In the present examples, each motor (100, 200) includes a three phase stator assembly (104, 204) and six permanent magnets (112, 212). Accordingly, the motors are brushless type three phase DC motors. However, other motors having two or more phase stators and two or more permanent magnets attached to the rotor assembly will also benefit from the aspects of the present invention detailed below.

Rotor Assembly Mechanical Design

Figure 3:
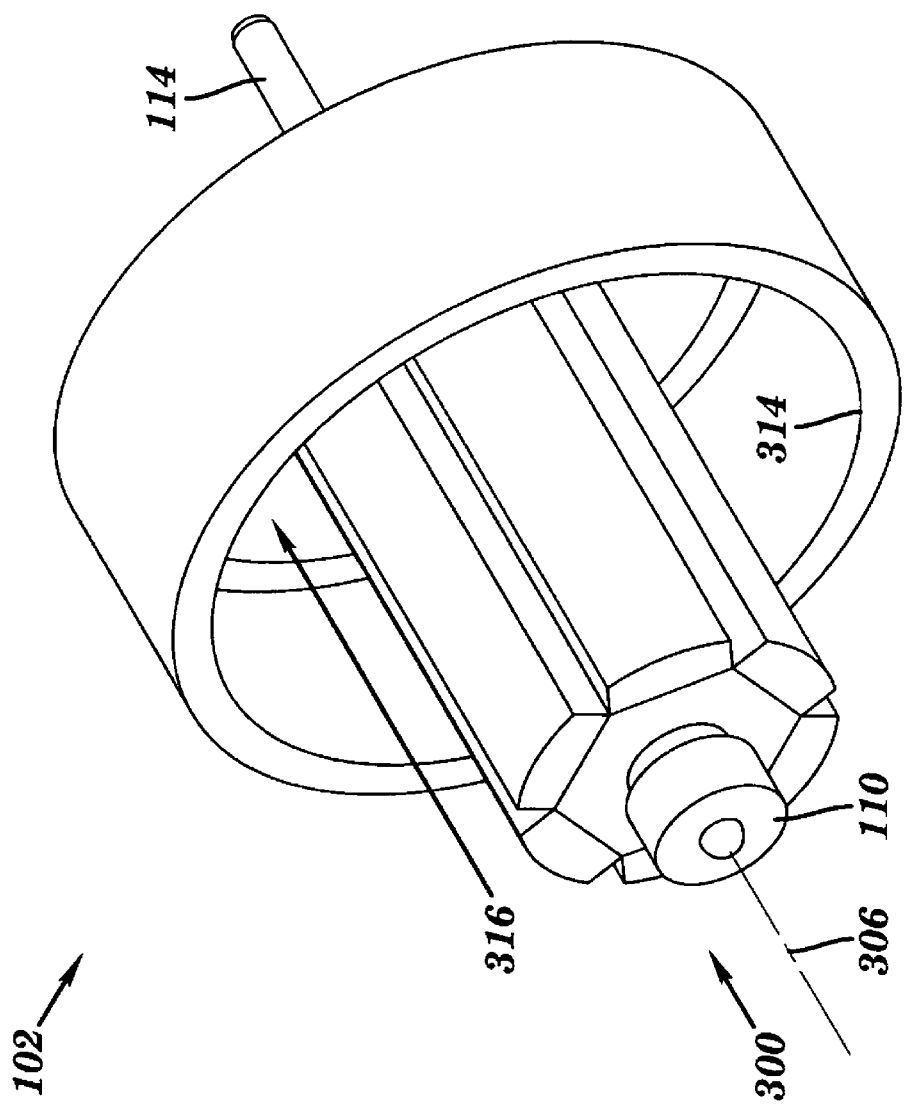
FIG. 3 illustrates an isometric view of an improved DC motor rotor assembly according to the present invention.
Figure 4:
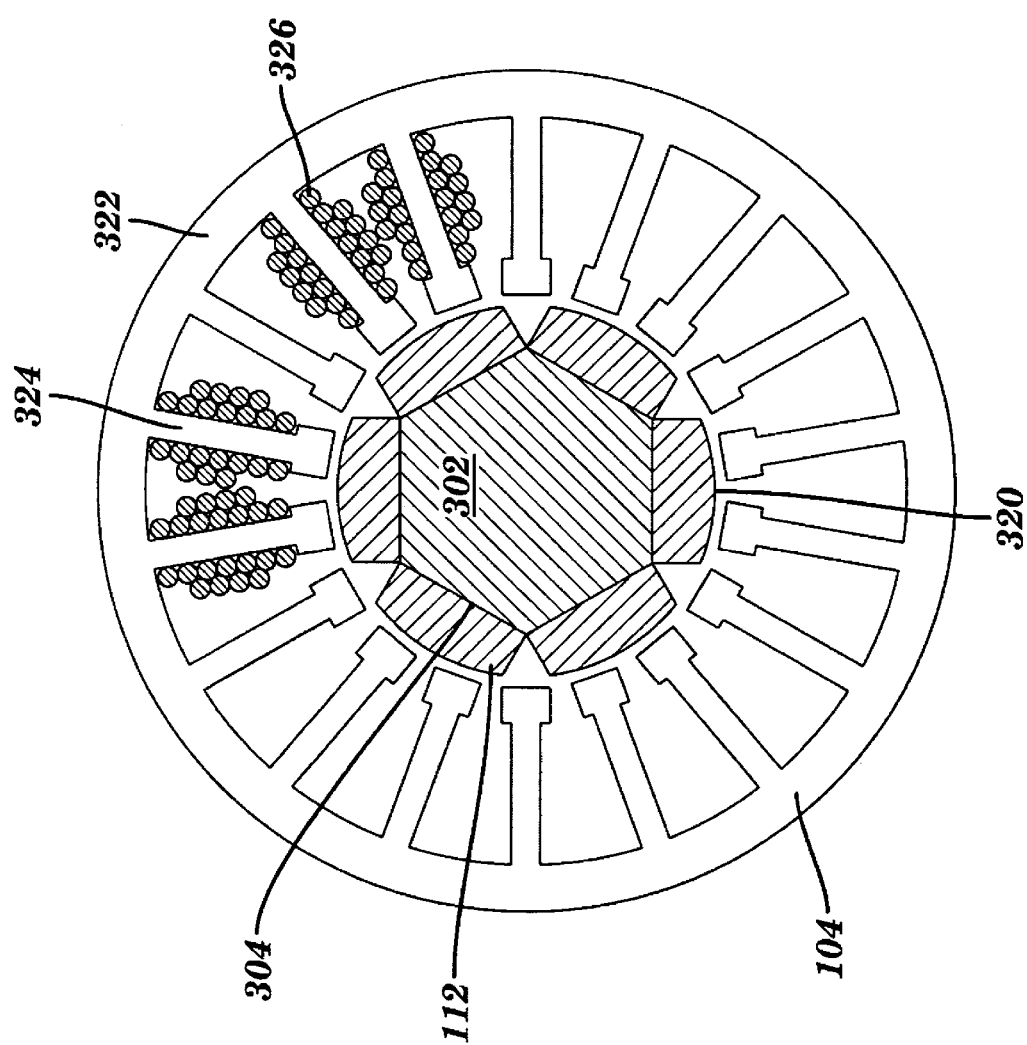
FIG. 4 illustrates a section view taken through a longitudinal axis of the improved DC motor rotor according to the present invention.

Referring to FIGS. 1, 3 and 4, the flywheel portion 118 of the improved motor 100 is unitary with a solid rotor shaft element 300. A radially extending wall 316 protrudes from a solid longitudinal rotor shaft portion and supports an annular flywheel mass 314 at a position radially distal from its rotation axis 306. The flywheel portion and flywheel support structure of the unitary shaft element 300 comprise a hollow tubular shaped mass 314 supported concentrically with the rotation axis 306, at an extended radial distance therefrom, by the radially extending wall 316, formed at the front end of the unitary shaft element 300. The wall 316 supports the tubular mass 314 radially distal to the stator assembly 104 and provides additional rotating mass to the flywheel portion of the solid unitary shaft element 300. The improved flywheel portion 314 has a significantly larger flywheel cross-sectional area than the prior art flywheel portion 218. As compared to the prior art flywheel portion 218 the shape and unitary construction of the improved flywheel portion provides increased rotor assembly stiffness and increased moment of inertia. In addition, the cost of manufacturing the improved rotor assembly 102 is reduced. The cost reduction is accomplished by eliminating parts and labor as compared with the prior art rotor assembly 202 as well as by eliminating higher cost materials.

As shown in FIG. 2, the prior art rotor 202 includes a separate flywheel portion 218, formed of tungsten to increase its mass. In addition the prior art flywheel portion 218 is attached to the rotor shaft by threaded fasteners 219 which add labor, decrease stiffness and add complexities to the manufacture of both the rotor shaft portion and the flywheel portion. According to improvements of the present invention, the unitary shaft and flywheel design utilizes a single material and this causes the dynamic balance of the rotor assembly to remain constant over wide range of operating temperatures. Additionally the single material construction eliminates thermal stresses caused by different thermal expansion rates of the prior art Aluminum/Tungsten rotor assembly.

Figure 5:
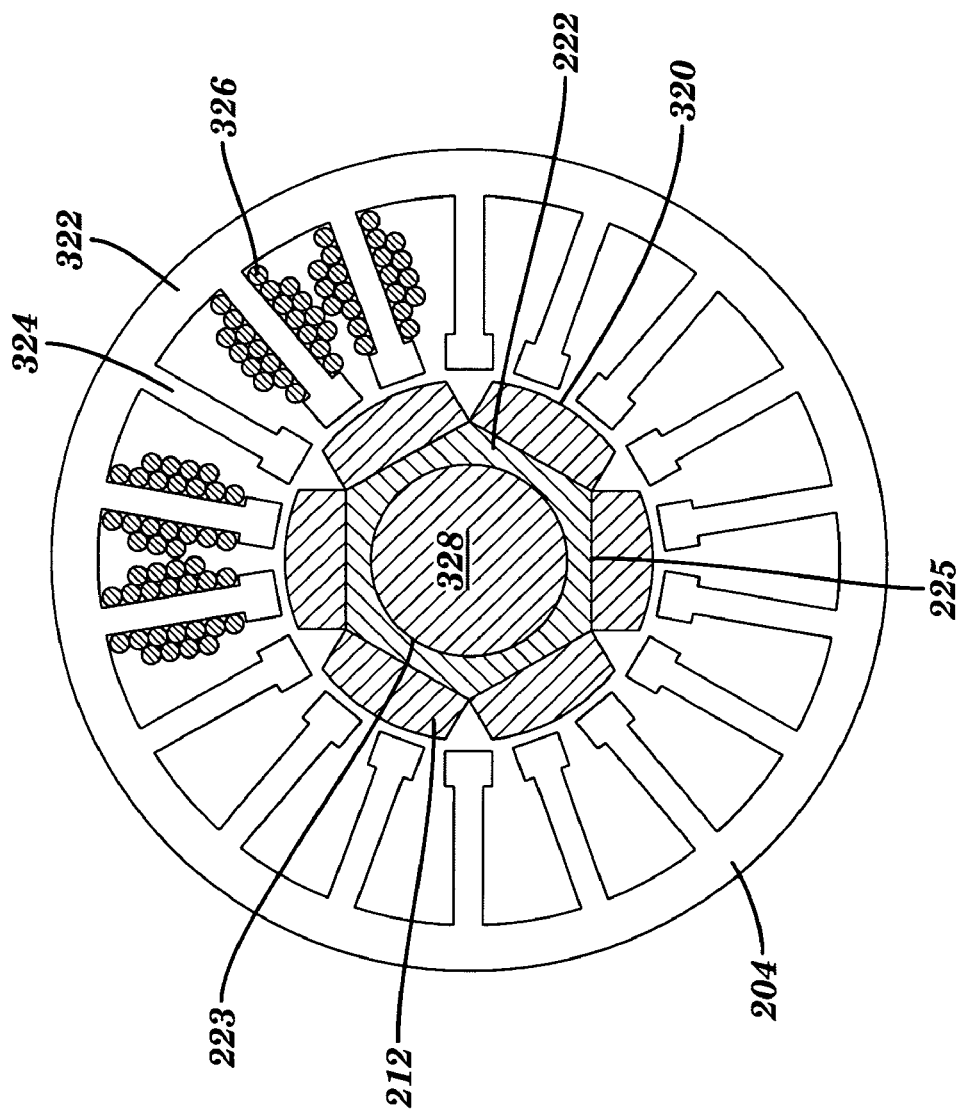
FIG. 5 illustrates a section view taken through a longitudinal axis of one example of a conventional DC motor rotor used in the prior art.

Referring to FIGS. 1 and 4, the improved rotor shaft element 300 provides a solid shaft portion 302 having a substantially hexagonal cross-section along most of its longitudinal length. The hexagonal cross-section provides six flats 304 for supporting six permanent magnets 112, one on each flat. The flats 304 are formed symmetrically about the rotation axis 306 with a normal axis of each flat surface 304 oriented substantially perpendicular with the rotation axis 306. Each magnet 112 extends along the full longitudinal length of the flat 304 and is fastened to the flat, e.g. by adhesive bonding. The entire rotor shaft element 300 is formed from a ferromagnetic material of high relative magnetic permeability, e.g. at least 300 and preferably more than 600. Such materials include 1018 carbon steel or 416 stainless steel, which are relatively inexpensive and easily formed by conventional metal forming processes. As will be further explained below, the solid rotor construction and high relative magnetic permeability of the rotor material improve the motor performance. As shown in FIGS. 2 and 5 the prior art rotor assembly 202 utilizes a separate magnet support element 222. The magnet support element 222 comprises a hexagonal outer section having six flats 225 and a hollow central bore 223 passing along its full longitudinal length. Six permanent magnets 212 extend along the full longitudinal length of the magnet support element 222 and attach to the flats 225, e.g. by adhesive bonding. The hollow bore 223 fits over a separate shaft portion 328 of the rotor shaft. The magnetic support element 222 is captured on the separate shaft portion 328 between a nut 224 that threads onto a threaded portion 226 and a shoulder 225 provided on the shaft portion 328. As compared to the prior art magnet support structure, the improved rotor assembly 102, of the present invention, increases the stiffness of the rotor assembly 102 by providing a solid cross-section that includes the flats 304 for providing magnet support. The improved rotor assembly 102 eliminates the nut 224, the threaded portion 226 and the magnet support element 222, as well as reducing assembly labor cost. As will be further detailed below, the improved magnet mounting structure also improves motor performance.

The stiffness of the improved rotor assembly 102 is further increased and the manufacturing cost further reduced by other improvements. In particular, the shaft element 300 includes a solid rear bearing support diameter 308 formed unitary therewith and extending from a rear face of the hexagonal cross-section 302 for supporting an inner race of the rear bearing 110 fixedly mounted thereon. A recessed cavity 310 formed in the rear face of the hexagonal cross-section 302 surrounds the rear bearing support diameter 308 to house a hollow cylindrical compression spring 312. The spring 312 fits over the diameter 308 between the inner race of the rear bearing 110 and an end wall of cavity 310. The spring 312 provides a longitudinal preloading force to eliminate play between the inner and outer races of the front and rear bearings. The rotor shaft element 300 further includes a solid front bearing support diameter 318 formed unitary therewith and extending from a front face of the rotor shaft element 300 for supporting inner races of a pair of matched duplex front bearings 108 fixedly mounted thereon. The front bearing support surface 318 and the rear bearing support surface 308 are substantially concentric with the rotation axis 306. The crank pin 114 is installed in a bore provided in a front end face 116 of the rotor shaft element 300. Although improvements to the rotor assembly 102, and specifically the solid rotor shaft element 300, were motivated by a desire to improve the motor performance, as is discussed below, an added benefit is that the manufacturing cost of improved rotor assembly 102 is reduced by 20% compared to the manufacturing cost of the example prior art rotor 202. The cost savings were provided by reductions in material cost, part manufacturing cost, and labor cost. In, an unforeseen benefit of the design of the improved rotor 202, the mass distribution of the assembly is more consistent from rotor to rotor, so that the improved rotor assembly 102 is rotationally balanced by design. This has allowed Applicants to eliminate an expensive manufacturing step of dynamically balancing each rotor using specialized dynamic equipment. However, if required, e.g. for a high performance motor, a dynamic balancing machine can be used to fine tune the rotor dynamic balance. Tests have shown that machine balancing the improved DC motor rotor can reduce vibration export up to 40%.

Figure 6:
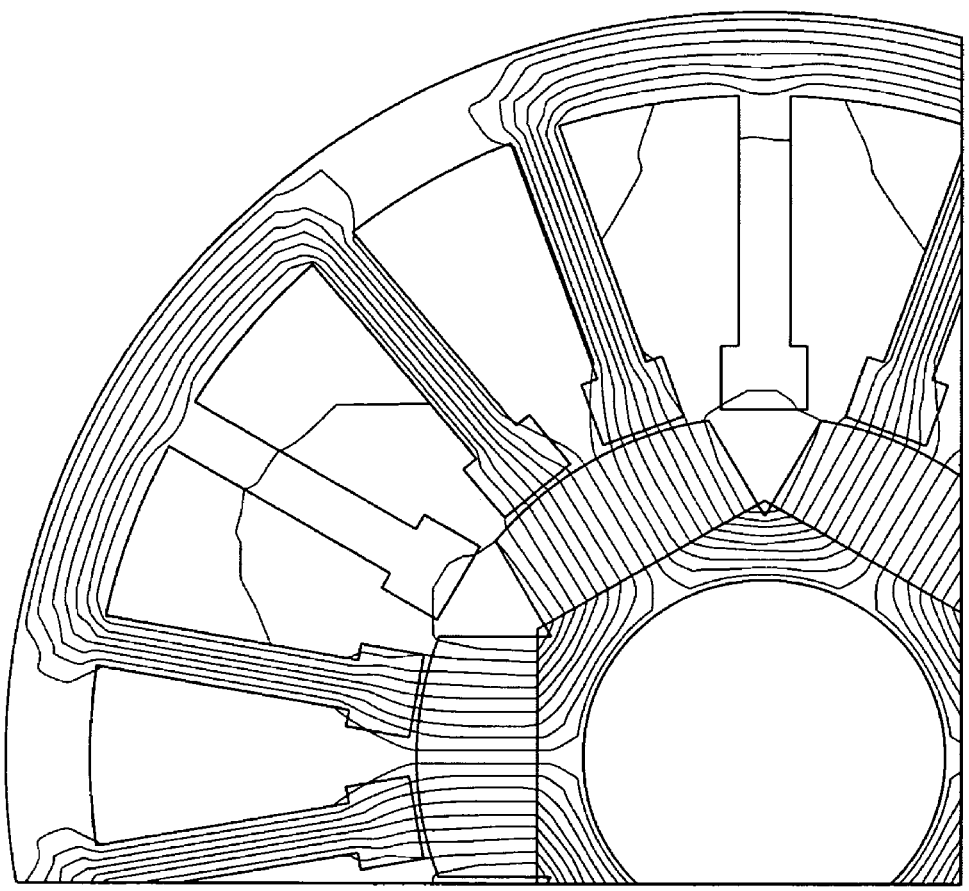
FIG. 6 illustrates a magnetic flux density map of a DC motor magnetic circuit having a non-solid rotor shaft.
Figure 7:
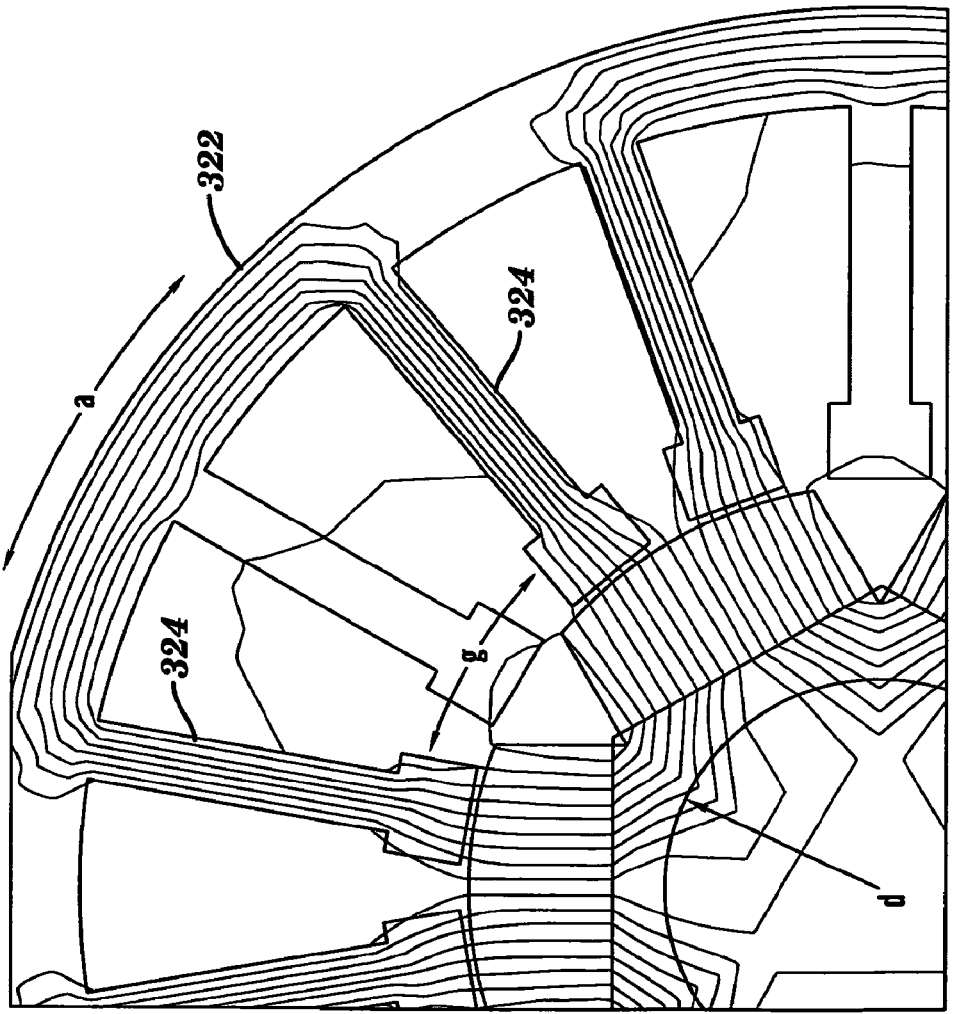
FIG. 7 illustrates a magnetic flux density map of a DC motor magnetic circuit having a solid rotor shaft.

DC Motor Magnetic Flux Density Improvements:

FIGS. 3, 4 and 7 show the construction and operation of an improved DC motor 100, and specifically as related to its increased magnetic permeance in the rotor shaft portion 302. FIGS. 5 and 6 depict the construction and operation of the prior art DC motor 200 to show the magnetic permeance of the prior art rotor cross-section. In FIGS. 4 and 5, motor cross-sections 4-4 and 5-5 show the stator assemblies, 102 and 202, with six permanent magnets 112 and 212 attached to the solid hexagonal cross-section rotor shaft portion 302, in FIG. 4, and attached to the hexagonal outer surfaces of the non-solid magnet support element 222, in FIG. 5. The construction of the prior art rotor 202 is such that its solid portion 328 comprises non-magnetic series 300 stainless steel and the hollow magnet support element 222 comprises 1018 steel which has a high relative magnetic permeability. The improved solid rotor shaft 302 may comprise a magnetically permeable series 400 stainless steel and specifically 416 stainless or the solid rotor shaft 302 may comprise a low carbon steel, e.g. 1018 steel. The models of FIGS. 5 and 6 were used to compare a hollow shaft element constructed of 1018 steel with a solid shaft portion 302 also constructed of 1018 steel. An air gap 320 separates the rotatable magnets 112, 212 from the stationary stator assemblies 104, 204. The stator assemblies 104, 204 and the permanent magnets 112, 212 are substantially identical in the two motors, with each stator comprising a continuous circumferential outer ring portion 322 and a plurality of inwardly extending radial arms 324 extending inwardly toward the rotor rotation axis 306 and ending at the air gap 320. As is well understood, radial arms 324 are wound with wire coils or windings 326 to form electro-magnetic circuits. Current flowing through the windings 326 causes a magnetic flux to be generated within wound radial arms 324 and a magneto motive force generated by the magnetic flux acts across the air gap 320 causing the permanent magnets to move in reaction thereto, and causing the rotor assembly to rotate. A current driver, not shown, controls current flow in each phase of the motor to control motor rotation.

Figure 8:
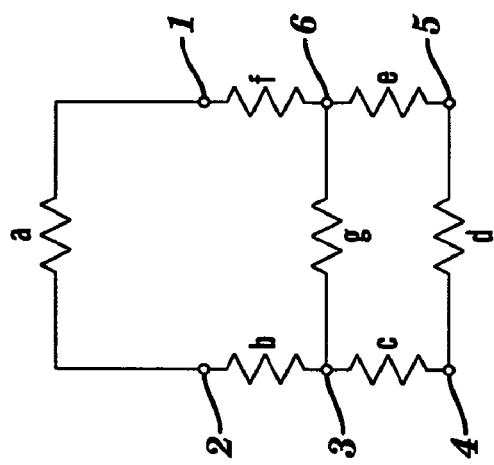
FIG. 8 illustrates a schematic representation of a DC motor magnetic circuit.

FIGS. 6 and 7 depict magnetic flux density plots generated by a computer model of a magnetic circuit typical of each phase of the two DC motors 100, 200. The flux density plots show the magnitude of magnetic flux density as a function of position within the magnetic circuit. Darker regions, having a larger number of magnetic flux lines closely spaced together indicate areas of high magnetic flux density, such as within the permanent magnets. Lighter regions, having fewer magnetic flux lines spaced further apart indicate areas of lower flux density, such as the magnetic flux leaking directly between adjacent magnets. FIG. 8 depicts a schematic representation of the magnetic circuit of a single motor phase. The magnetic circuit comprises a plurality of magnetic flux pathways, each having a magnetic permeance, which is a gauge of the relative ease that magnetic flux flows through the pathway. The schematic of FIG. 8 represents each pathway of the magnetic circuit by a permeance element (a-g), connected between two nodes (1-6). The magnetic circuit comprises two adjacent permanent magnets, two passes across the air gap 320, two wound radial arms 324 connected by the outer ring 322, and a pathway through the solid rotor shaft, 302, (re-ferred to as the magnet back iron), in FIG. 7, or the hollow magnet support element 222, in FIG. 6. In the schematic representation of FIG. 8, the permeance element a between nodes 1 and 2 represents the pathway passing from an air gap end of a first wound radial arm 324 up to and across the stator outer ring 322, a down through a second wound radial arm 324 to its air gap end. The permeance element b, between nodes 2 and 3, represents one pass through the air gap 320. The permeance element c, between nodes 3 and 4, represents a pass through a first permanent magnet. The permeance element d, between nodes 4 and 5, represents a pathway through the rotor shaft 302 or 222. The permeance element e, between nodes 5 and 6, represents a pass through a second permanent magnet, and the permeance element f, between nodes 6 and 1, represents a second pass across the air gap 320. The permeance element g, between the node 3 and 6, represents magnetic flux leakage passing directly between the adjacent first and the second permanent magnets.

Magnetic permeance (P) in Webers/Amp for a given pathway is defined by Equation (1):

$$P=\mu A/L \qquad (1)$$

where $\mu$ is the magnetic permeability of the material in (Webers/Amp m), A is the cross-sectional area of the flux pathway in (m2), and L is the length of the flux pathway in (m). As shown by equation (1), the magnetic permeance of any pathway in the circuit can be increased by increasing the material permeability $\mu$, by increasing the material cross sectional area A, or by increasing both. An analysis of the model of the DC motor shown in FIG. 6 revealed that magnetic flux density in the magnetic support element 222, of the prior art DC motor 200, is significantly lower than the magnetic flux density in other portions of the magnetic circuit. Applicants recognized that the design of the prior art magnet support element 222 presented a relatively high resistance to flux flow through magnetic circuit, as compared to other elements in the magnetic circuit, due to the narrow cross-section of the magnet back iron of magnet support element 222. To correct the problem, two approaches were used.

In a first embodiment of the present invention, the solid shaft 302 described above, provides increased cross-sectional area of the magnet back iron and the shaft material comprises a magnetic series stainless steel, e.g. 416 stainless steel. The relative magnetic permeability of 416 stainless steel, (as compared to the magnetic permeability of a vacuum), ranges from 700-1000. This configuration provides all of the benefits of a unitary rotor shaft, as described above, however, the magnetic performance P as detailed in equation 1 shows that the magnetic permeance of the solid shaft portion or magnet back iron of the first embodiment of the invention is only slightly increased over the magnetic permeance of the prior art magnetic back iron. Accordingly, only a slight improvement in motor efficiency is gained by providing a solid motor shaft 302 comprising 416 stainless steel. However, the first embodiment solid shaft provides all of the other above described benefits of a solid shaft construction are achieved and the overall cryocooler performance is slightly improved due to the slightly increased motor efficiency.

In a second and preferred embodiment of the present invention, a solid hexagonal shaft cross-section 302 comprises a low carbon steel, e.g. 1018 steel. The relative magnetic permeability of low carbon steel, which includes, 1080 carbon steel, usually exceeds 2000. Accordingly, the magnetic permeance of the improved magnet back iron of the second embodiment of the present invention is increased by increasing its cross-sectional area and its magnetic permeance. Of course, other materials with even greater relative magnetic permeability, e.g. Alloy 49 Iron-Nickel, which has a magnetic permeability of 75,000, can also be used to significantly increase magnetic flux flow within the rotor shaft or magnet back iron with no other changes to the design. However, once the permeance of the rotor shaft increases significantly over the permeance of other elements of the magnetic circuit, the flux flow in the magnetic circuit is limited by the other circuit elements. This is shown using conventional circuit analysis based on the magnetic circuit of FIG. 8. By isolating the rotor, permeance element d, in the circuit of FIG. 8, is can be shown that an incremental increase in the permeance of the rotor element d is proportional to total circuit flux as a function of log(increase in permeance in the magnet back iron).

In a preferred embodiment of the present invention, the DC motor 100 comprises a solid hexagonal cross-section rotor 302 comprising 1018 carbon steel. Test results using the improved motor 100 showed the following improvements in the performance of the DC motor 100. In addition, related improvements in the performance of a compressor and cryocooler system due to the increase rotor flux density alone are also listed below in TABLE 1:

TABLE 1

Performance Improvements Provided by a Solid Rotor Comprising 1018 Steel

| Tested performance factor | Improved performance | Test Condition |
| --- | --- | --- |
| No Load motor RPM | Increased by 30% | Same input voltage |
| Compressor RPM | Increased by 18% | Same refrigeration gas pressure |
| Time to cool a test load to operating temperature (Cool down Time) | Reduced by 22% | Same cooling load |
| Maximum cooling power achieved | Increased by 8% | Same input voltage |
| Steady nominal input electrical power | Increased by 1.8% | Same input voltage |

Figure 9:
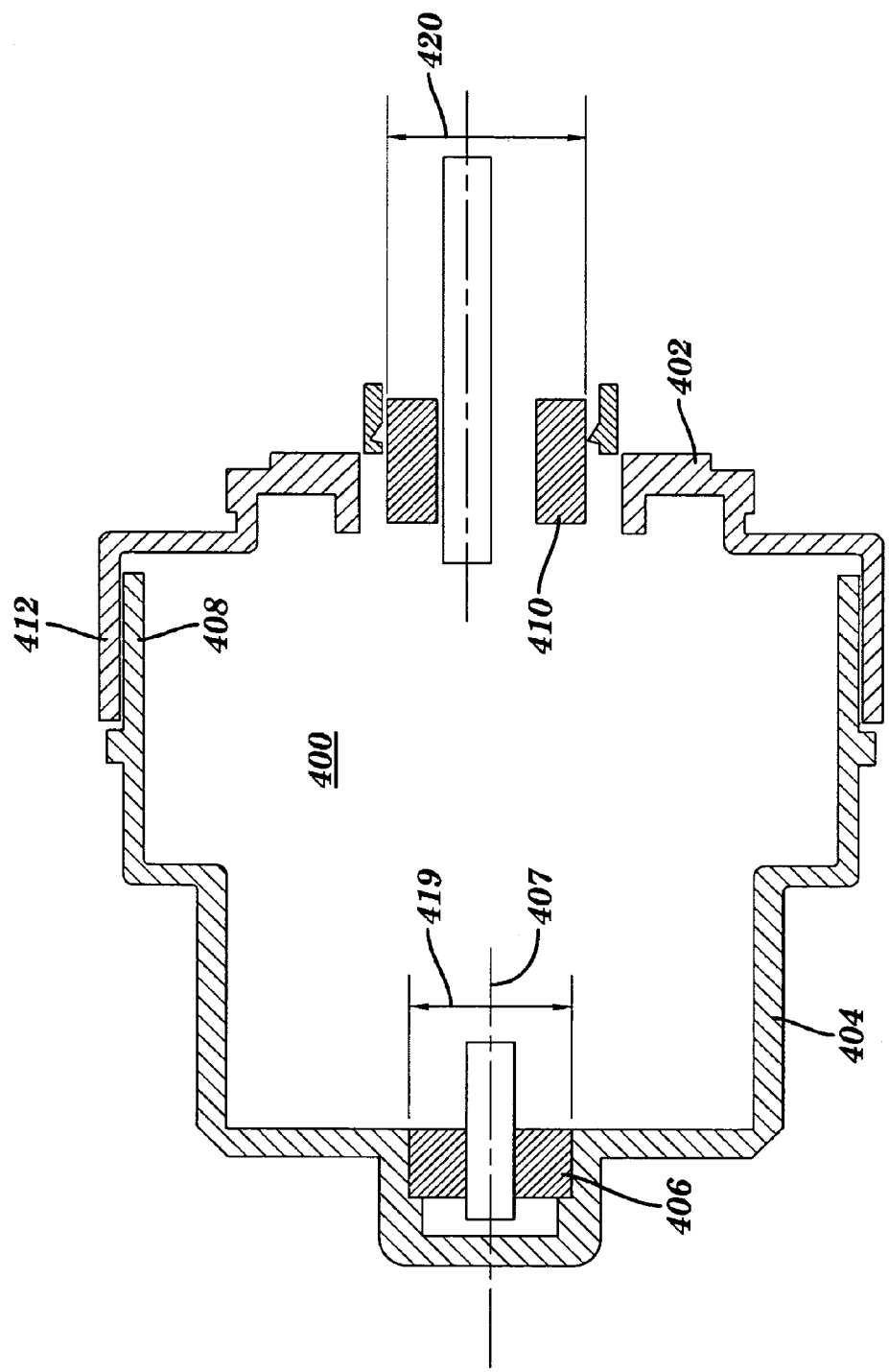
FIG. 9 illustrates a section view taken through an improved DC motor cover set according to the present invention.

Improved Dc Motor Cover Set:

In another aspect of the present invention, a removable DC motor cover set 400 is shown in section view in FIG. 9. The cover set includes a front cover 402 and a rear cover 404. Each cover 402, 404 comprises a cup shaped hollow annular shell having an open end for receiving internal motor parts therein, and a closed end for sealing the motor parts when the cover set 400 is fit together. The rear cover 404 attaches at its closed end to rear bearing 406 and includes a protruding hollow annular male portion 408, at its open end, for mating with the front cover 402. The front cover 402 attaches at its closed end to front bearing 410 and includes a protruding hollow annular female portion 412, at its open end, for receiving the rear cover male portion 408 therein.

Figure 10:
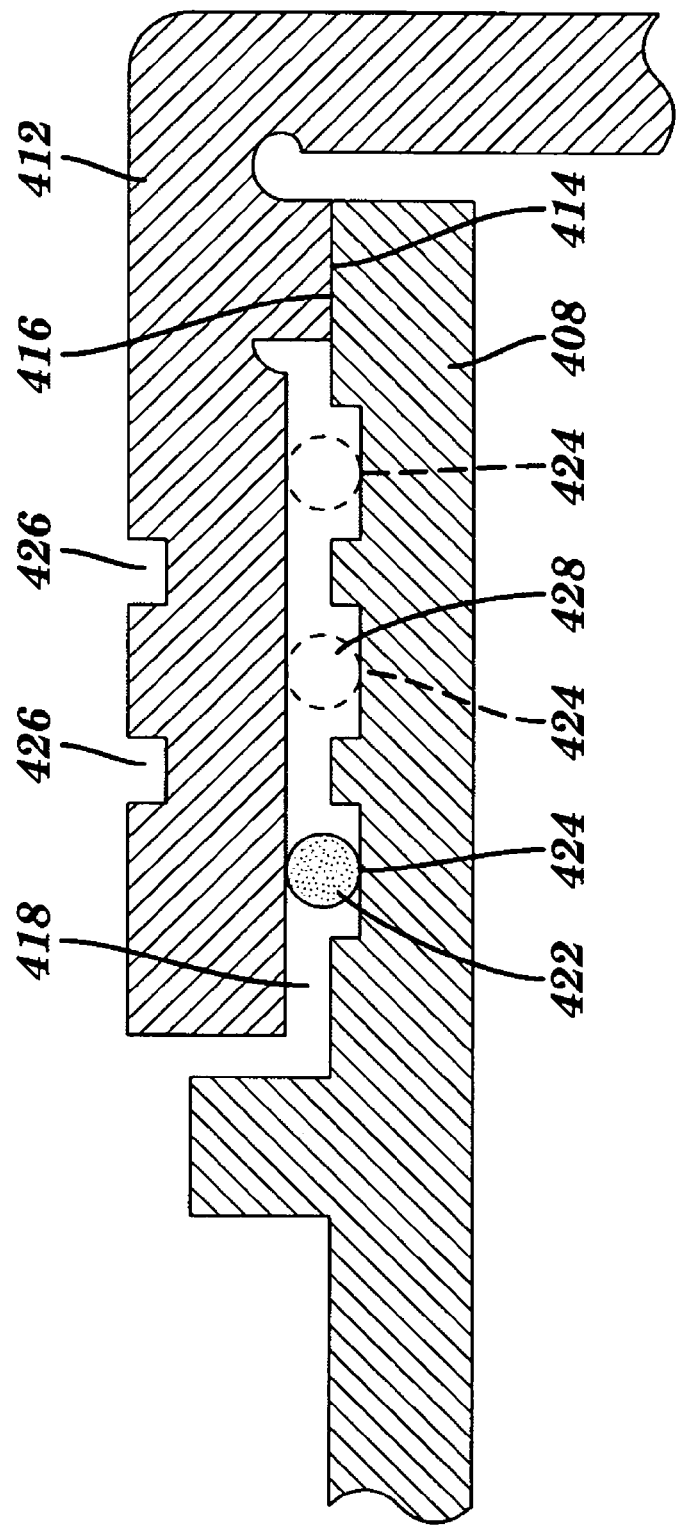
FIG. 10 illustrates an expanded section view taken through overlapping sections of the improved DC cover set according to the present invention.

FIG. 10 depicts an exploded section view of the interlocking male and female portions of the front and rear covers. The features of the interlocking male and female cover portions, shown in section view in FIG. 10, continuously extend circumferentially around the cover set 400; however, some of the features may be non-continuous. To align the front cover 402 and the rear cover 404, alignment diameters are provided on each cover. In the female portion of the front cover 412, a bore having an inside diameter 414 is formed therein to provide an alignment feature for receiving a mating surface of the rear cover therein. In the male portion of rear cover 408, an outside diameter 416 is sized to mate with the bore 414 to align the covers at assembly. With the covers aligned by the mating alignment diameters 414 and 416, a circumferential gap 418 provides clearance between the mating rear cover male portion 408 and the front cover female portion 412. With the cover set aligned thereby, the assembled cover set is line-bored along its center axis 407 to provide the final diameters 419 and 420 for receiving the rear bearing 406 and the front bearing 410 therein. By line-boring the bearing diameters 419, 420 while the cover set is assembled and aligned by the diameters 414, 416, any misalignment of the bearing axes caused by misalignment in the fit of the cover set is avoided.

As was discussed above, the cover set 400 provides a pressure seal for maintaining the motor at an elevated gas pressure during operation. Accordingly, any seams in the motor cover set are pressure sealed. To seal the circumferential air gap 418, a circumferential layer of bonding adhesive 422 is applied in a circumferential bonding recess 424, which is formed on the rear cover male portion 408. The circumferential layer of adhesive 422 not only seals the cover set but also provides the mechanical holding force for fastening the front and rear covers in place. The circumferential layer of adhesive 422, applied in the factory has heretofore, not been easily reopened, e.g. to make a motor repair. Moreover, if the covers were reopened, the cover set was scrapped and replaced by a new cover set. Accordingly, it has not been practically acceptable to repair a damaged motor and damaged motors were replaced.

According to the improvements of the present invention, the cover set 400 may be reopened, e.g. to make a motor repair, and then closed again and resealed with a pressure seal. This allows a motor to be repaired, e.g. to have its bearings to be replaced, even in the field, by a customer or a service technical. To reopen the cover set, the female portion 412, of the front cover 402, includes one or more circumferential features 426, formed thereon, for marking or otherwise identifying a circumferential location for cutting, or otherwise separating, the front cover 402 from the rear cover 404. The circumferential features 426 may comprise a marking line, e.g. marked or scribed onto the outside of the cover 402, or the circumferential features 426 may comprise a thin or weakened wall cross-section of the front cover female portion 412. For example, the features 426 may comprise a continuous or non-continuous v-groove or otherwise weakening area that may be easily broken by a hand applied force, or by a hand tool. Alternately, the features 426 may comprise a raised feature or a printed line, merely for marking a line along which to cut the front cover 402 from the rear cover 404 with a cutting tool. In any event, each circumferential feature 426, whether a continuous feature or a non-continuous feature, provides a circumferential indicator for identifying a location for removing the front cover 402 from the rear cover 404. By cutting the front cover 402 along the rear most circumferential feature 426, a small portion of the front cover 402 remains bonded to the rear cover 404 by the circumferential bond 422. This remaining portion of the front cover has no detrimental effect and remains in place. As shown in FIG. 10, a first or rearmost circumferential feature 426 is formed onto the outside diameter of the front cover female portion 412 on the front cover side of the adhesive bond 422 and the recess 424. A second recessed bonding groove 424 is formed on the outside diameter or the rear cover male portion 404 on the front cover side of the first circumferential feature 426 such that a second adhesive bond line 428, shown dashed, may be applied to reattach and reseal the cover set after it has been opened once to make a repair. Of course, a third and subsequent bonding recess grooves 424 can be added to the rear cover male portion 408, as shown in FIG. 10, to allow opening the motor a second and subsequent times, to make a repair, while still providing a bonding area for refastening and resealing the cover set. Similarly, second and subsequent circumferential features 426 may be formed on the outside diameter of the front cover female portion 412 for showing locations for cutting or otherwise removing further portions of the front cover 402 to reopen the motor cover set 400 as many times as may be required.

Figure 11:
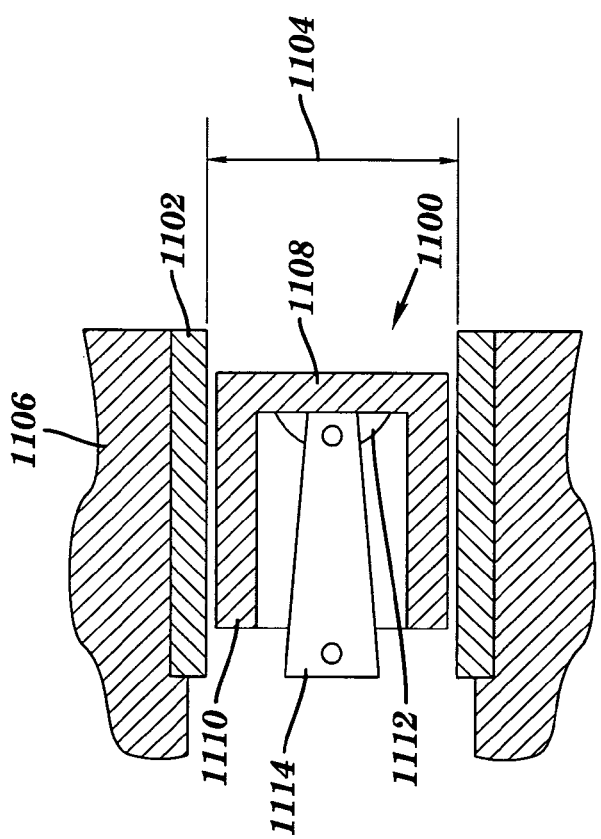
FIG. 11 illustrates a section taken through an improved compression piston and compression sleeve of the present invention.
Figure 14:
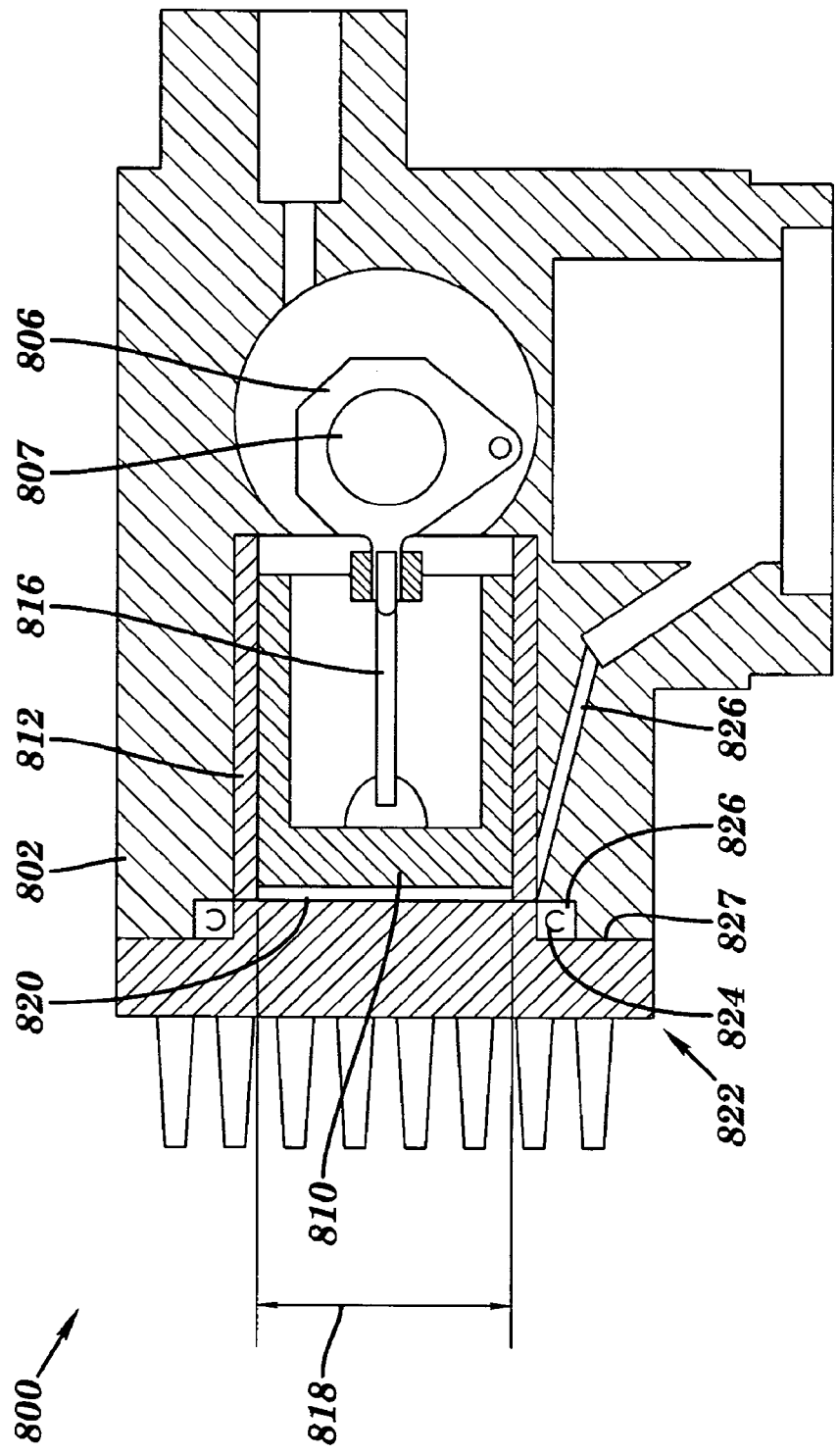
FIG. 14 illustrates a section view taken through a cryocooler compressor of the improved cryocooler of the present invention.

Compression Piston and Cylinder Sleeve Fabrication:

In further aspects of the present invention, FIGS. 11 and 14 depicts a cross-section of an improved compression piston 1100 and a mating cylinder sleeve 1102 according to the present invention. The cylinder sleeve 1102 comprises a thin walled annular sleeve having a compression bore 1104 formed therein and sized for receiving the compression piston 1100. A sealed compression cylinder volume comprises the cylinder bore 1104 sealed on its high-pressure end by a cylinder head cover, shown in FIGS. 14 and 17 and described below. A refrigeration gas is compressed by reciprocally driving the piston 1100 within the sealed compression cylinder. The piston is driven by drive link 1114 coupled to the DC motor described above. The cylinder sleeve 1102 installs within a bore provided in a crankcase 1106 and is held therein by a LOCKTITE adhesive, or the like.

The compression piston 1100 comprises a cup shaped element with a solid circular disk portion 1108 forming a high-pressure end thereof. The piston 1100 is open at a low-pressure end thereof and includes an annular cylindrical wall portion 1110 that extends toward the low-pressure end from an outer circumferential edge of the solid disk portion 1108. The piston wall portion 1110 extends substantially along most of the longitudinal length of the cylinder bore 1104 and includes an outside diameter sized for mating with the cylinder bore diameter 1104. The wall portion 1110 provides a bearing surface for mating with the cylinder bore 1104. A drive clamp 1112 extends from the center of the disk portion 1108, on a low-pressure side thereof, for connecting the piston 1100 with the drive link 1114. In a preferred embodiment, the piston 1100 comprises a unitary solid element, but other piston configurations formed by multiple interconnected elements are usable.

According to the present invention, each of the compression piston 1100, the cylinder sleeve 1102 and the crankcase 1106 have the same coefficient of thermal expansion. This design athermalizes the compressor by eliminating non-uniform thermal expansion and shrinkage caused by thermal cycling when non-matched thermal coefficient materials are combined. In particular, by constructing all three elements from the same material, the compressor performs uniformly over a wider range of ambient temperatures. In particular, the athermalized design according to the present invention, substantially eliminates compression piston stalls when the compressor is subjected to very low ambient operating temperatures, e.g. in high altitude aircraft. In a preferred embodiment, the crankcase 1106, the cylinder sleeve 1102 and the compression piston 1100 are each fabricated from aluminum and specifically 6061-T6 aluminum.

As stated above, compressor performance depends strongly on providing a substantially zero clearance circumferential gap between the compression piston 1100 outside diameter and the compression cylinder bore diameter 1104. As a point of clarification, a substantially zero circumferential gap ideally provides a very minimal clearance between the mating elements and the gap is ideally between 1-3 microns per side. Moreover, variations in the circumferential gap clearance degrade compressor performance and gap size expansion due to wear eventually end the useful life of the compressor. According to the present invention, a wear in process is used to provide a desirable circumferential gap condition, without the need for precision machining, grinding and honing, used in the prior art. The wear in process taught herein reduces the cost and complexity manufacturing a cryocooler compressor and may extend to any gas compressor.

In a first fabrication step, a solid aluminum piston 1100 is formed with an outside diameter machined to an undersized dimension with respect to its desired final diameter for mating with the cylinder bore 1104. The piston 1100 is formed using conventional numerical control NC metal cutting capabilities for aluminum. In a second fabrication step, a substantially uniform thickness layer comprising a malleable, shock absorbing, vibration dampening material that includes a solid lubricating compound impregnated therein is applied over the piston outside diameter. The layer thickness is sufficient to provide the desired shock absorbing and vibration dampening properties and an oversized piston outside diameter dimension with respect to its desired final outside diameter dimension for mating with the cylinder bore 1104. In a specific example, the piston outside diameter layer comprises RULON. RULON comprises a polymetric reinforced PTFE compound available in sheets or strips from DIXON DIVISION OF FURON of Bristol R.I., USA. In the present example, a RULON strip with a thickness of approximately 0.13-0.38 mm, (0.005-0.015 inches), a width equal to the width of the piston outside diameter and a length equal to the piston circumference dimension is bonded onto the piston outside diameter by an adhesive. The RULON layer provides a low friction surface layer filled with a solid lubricant, namely PTFE, and is relatively soft compared to the metal surfaces of the piston and cylinder sleeve. The RULON material is suited for stop start applications and operates over a temperature range of −70 to 200 Deg. F. RULON has a coefficient of thermal expansion that is higher than the coefficient of thermal expansion of most metals so thermal cycling of a compressor made with the RULON layer can affect the dimension of the piston to cylinder circumferential gap, even in the athermalized compressor design of the present invention. In addition, the RULON layer is sufficiently thick that even after the wear in process, described below, the remaining RULON layer provides mechanical vibration damping and shock absorption properties that damp piston natural vibration in the compressor. Of course, other material layers may also be applied to the piston outside diameter for providing these same properties, namely any material having the properties of providing a self lubricating low coefficient of friction, a material layer that is softer than, and wearable by, mating metal surfaces, and has damping characteristics for damping natural vibration frequencies of the piston.

The cylinder sleeve 1102 comprises a solid aluminum sleeve formed by conventional NC metal cutting of aluminum. The cylinder sleeve outside diameter is machined slightly undersized with respect to a desired final diameter for mating with the crankcase 1106 and the sleeve inside diameter is machined slightly oversized with respect to a desired final diameter for mating with the piston 1100. After forming, the cylinder sleeve 1102 is plated over its entire surface with a low friction wear resistant hard coat layer such as a composite layer of nickel applied by a conventional electroless chemical deposition process. The thickness of the nickel plate layer usually ranges from 0.025-0.76 mm, (0.001-0.003 inches) and provides a surface hardness of approximately Rockwell C (RC) 70. By appropriate selection of the initial cylinder machining diameters the cylinder sleeve outside and inside diameters may be sized to desired final dimensions after plating, without requiring any further material processing steps for further sizing or changing the geometry of its diameters. An advantage of the cylinder forming steps of the present invention is that the size and shape of the completed cylinder sleeve 1102, including the cylinder bore 1104, are achieved by conventional numerical control, NC, metal cutting capabilities for aluminum.

A mating set of a piston 1100 and a cylinder sleeve 1102 are installed into a wear in fixture designed for running the mating parts together. The oversized piston outside diameter is press fit into the cylinder bore 1104 of its mating cylinder sleeve 1102 and connected to a reciprocating drive link. The drive link reciprocates the piston 1100 within its mating cylinder sleeve bore 1104 for many thousands of cycles to wear the surfaces in, by running the parts together, to achieve a desired circumferential fit. During the wear in process, particles of PTFE wear away from the oversized piston and impregnate into the nickel hard coat of the cylinder bore 1104. The impregnated RULON material reduces the coefficient of friction of the nickel plated bore surface and smoothes out any irregularities. The wear in process also compensates for minor geometrical errors in the circumferential gap. In particular, the wear in process continues to remove the RULON layer until a substantially zero clearance condition occurs and then the removal stops. The process is independent of minor geometry errors and causes the piston shape to conform to the shape of the cylinder bore 1104. Accordingly, the wear in process provides a "clearance seal" in the final compressor. A clearance seal allows a very thin layer of pressurized refrigeration gas to fill the circumferential gap during each compression pulse and the gas reduces mechanical contact between the wear surfaces of the mating parts, thereby substantially reducing contact wear.

Figure 13:
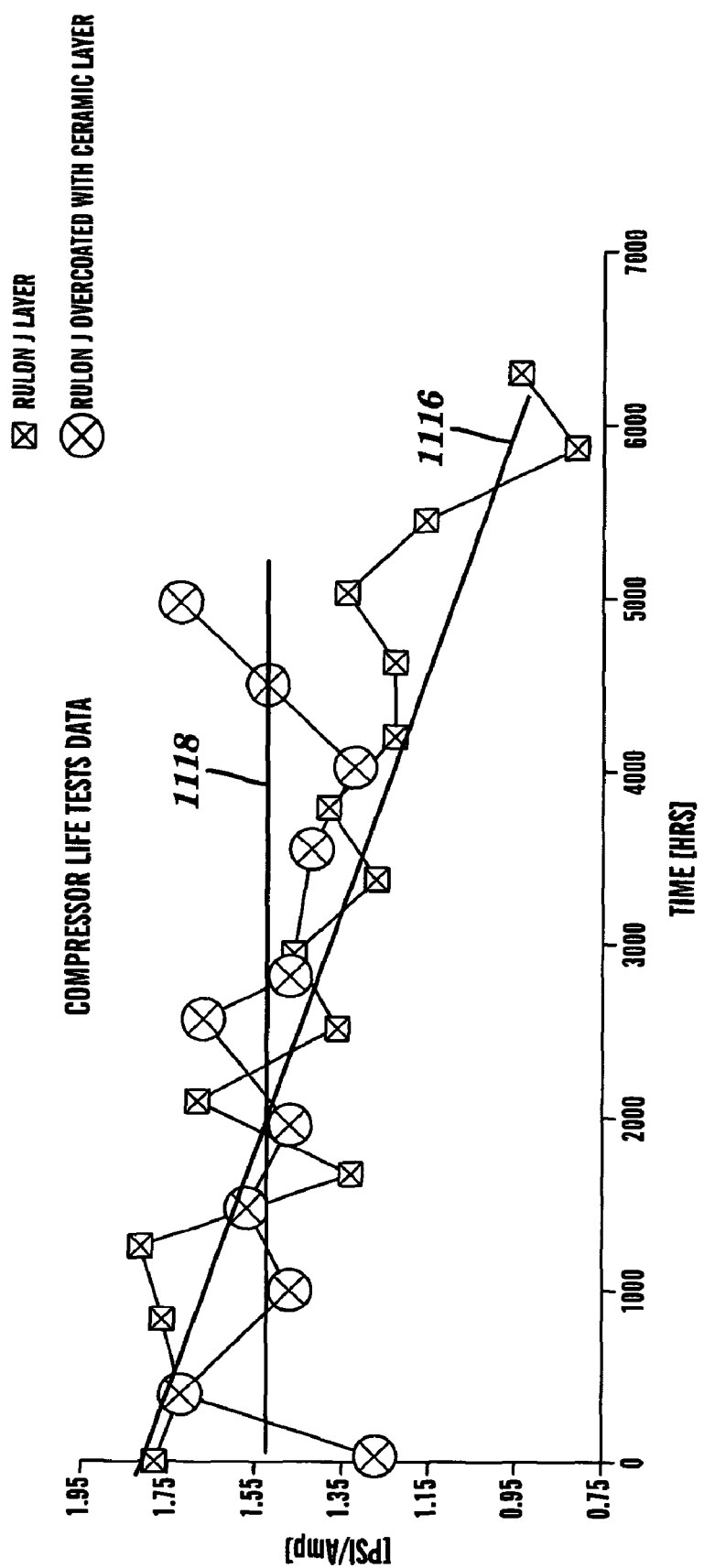
FIG. 13 is plot of compressor life test results illustrating the performance of improved compressor elements according to the present invention.

In a first embodiment of the invention, once the desired circumferential fit is achieved by the wear in step, the mating parts are considered finished and installed into a compressor crankcase 1106. The PTFE removed from the piston during wear in remains impregnated into the nickel plated cylinder bore surface and reduces friction over the entire life of the compressor, or until the PTFE is worn away. Results of an accelerated life test using a mating piston and cylinder sleeve formed according to the first embodiment are shown in FIG. 13. The Figure plots compression stroke pressure in pounds per square inch, (PSI), per ampere (Amp) of DC motor input current, on a vertical axis vs. operation time, in hours, on a horizontal axis. A performance curve 1116 shows that the trend of compressor performance is to degrade linearly over time. Using the performance metric shown in FIG. 13, the compressor performance degrades by approximately a 50% after 6000 hours of continuous operation. This performance is acceptable for most compressor applications; however, the data suggest that the piston RULON layer wears linearly in proportion to operation time. It is known that wear of the RULON layer is accelerated at higher temperatures because as the RULON layer expands with increasing temperature, with respect to the cylinder bore, and this seems to be the primary wear mechanism of the RULON layer.

In a second embodiment of the invention, further process steps and surface coating layers are added to the above-described methods to improve compressor performance. In particular, a layer of hard ceramic compound applied over the piston RULON layer after the completion of the above-described wear in cycle provides a low friction wear resistant protective layer over the piston RULON layer that prevents the RULON layer from wearing away over long-term use. To generate additional clearance in the circumferential gap to receive the ceramic layer on the piston outside diameter, additional wear in cycle steps are used to further wear away a portion of the RULON J. This is accomplished by elevating the temperature of the wear in fixture environment and conducting further run in cycles at elevated temperature, until the thickness of the RULON J layer is reduced by an amount substantially equal to the desired thickness of the ceramic coating layer to be applied. In particular, the elevated temperature wear cycle continues until a circumferential gap in the range of 0.13-0.38 microns, (5-15 micro inches), per side is provided. After the desired thickness of RULON is removed, the piston and cylinder sleeve are removed from the wear in fixture and cleaned of any loose material. A layer of hard ceramic compound comprising chrome nitride, (CrN) is then applied over the remaining RULON layer. The CrN layer is applied to a thickness of approximately 0.25 microns, (10 micro inches) per side by an ion beam assisted deposition process. A ceramic sub layer may also be applied over the RULON layer to enhance adhesion of the ceramic coating thereto. The CrN coating is available commercially from Advanced Materials Processing Corp. of North Chelmsford Mass., USA. This process provides the piston 1100 with a wear resistant outer layer having substantially the same geometry as provided by the wear-in cycle. The underlying RULON layer still provides desirable properties for damping piston vibration and absorbing shock. The improved ceramic coated piston 1100 provides excellent wear characteristics and particularly prevents piston surface wear by protecting the underlying RULON layer from wear when the compressor operates at elevated ambient temperatures. Results of an accelerated life test for a compressor using the improved ceramic-coated piston outside diameter are shown in FIG. 13. A performance curve 1118 shows that the trend of compressor performance is to remain substantially unchanged over time. Using the same performance metric shown in FIG. 13, the compressor performance has remained constant for 5000 hours of continuous operation. This performance is significantly improved over the performance curve 1116 for the RULON coated piston because the compressor efficiency remains constant over its life. In addition, the improved ceramic coated piston is capable of operating over a wider range of operating temperatures without the piston surface wear associated with high temperature operation of the piston having an unprotected RULON layer.

Compressor Seal and Cover Improvements

FIG. 14 depicts an improved cryocooler compressor 800 according to the present invention. The compressor 800 includes a solid aluminum crankcase 802, having a cavity 804, formed therein. The cavity 804 encloses a drive coupler 806, which is attached to and eccentrically movable with the DC motor crank pin 807. The drive coupler 806 drives both a compression piston 810 and a regenerator piston, not shown. A flexible drive link 816 connects the drive coupler 806 with the compression piston 810. An aluminum compression cylinder sleeve 812 installs in the crankcase 802 and provides a cylinder bore diameter 818 to receive the outside diameter of the compression piston 810 therein. The compression piston 810 reciprocates within the compression cylinder bore 818 to vary the volume of a compression volume 820 for compressing a refrigeration gas contained therein. The compression volume 820 is sealed at a high-pressure end thereof by an aluminum cylinder head 822, which is detailed below. A high pressure seal element 824 is installed within a recess 825, formed in a face of the crankcase 802, and captured in the recess 825 by a sealing surface 827 of the cylinder head 822. A fluid passage 826 provides a flow path for refrigeration gas to pass from the compression volume 820 to a regenerator cylinder. The refrigeration fluid passes repeatedly in both directions through the passage 826 between the compressor and the regenerator at appropriate phases of the refrigeration cycle.

Figure 16:
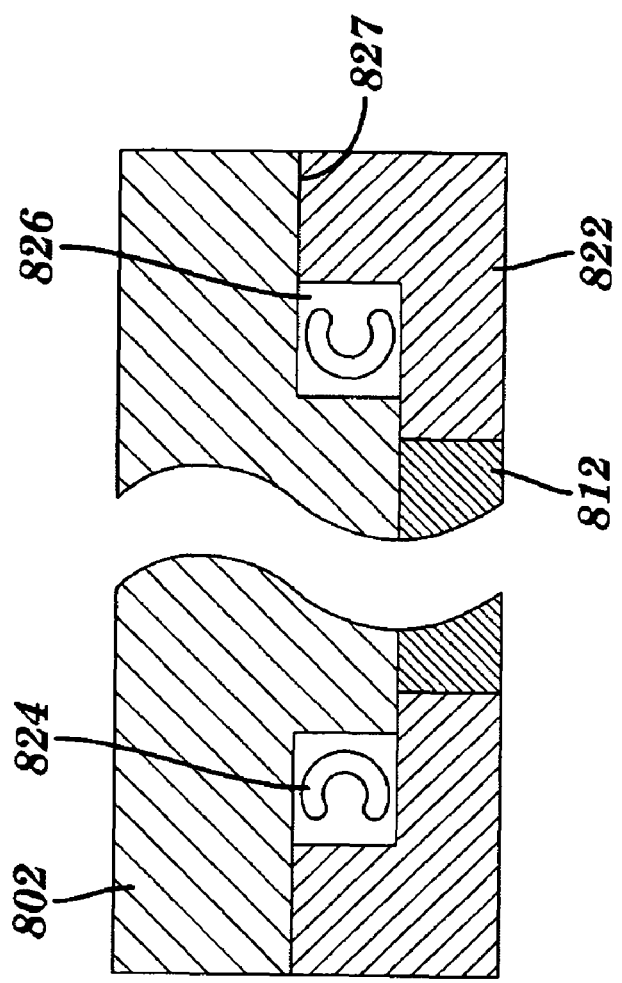
FIG. 16 illustrates a partial section taken the through a compressor showing the improved high-pressure seal installed in an operating position.
Figure 15:
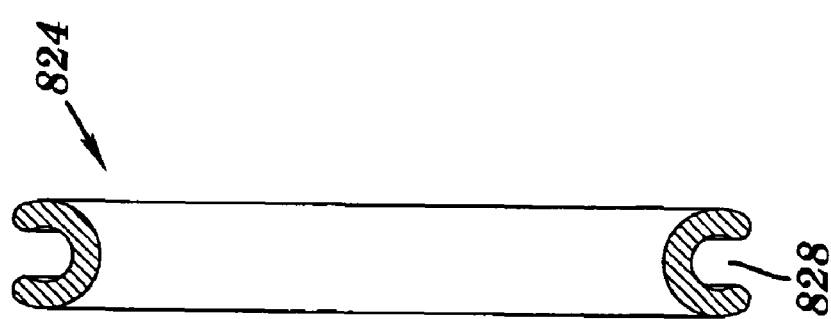
FIG. 15 illustrates a section view taken through an improved high pressure seal according to the present invention.

According to a further aspect of the present invention, the high-pressure seal 824 is shown in section view in FIG. 15. The seal 824 comprises a closed circular ring shaped element having an open cross-section 828 that faces away from a high-pressure volume to be sealed. In particular, the seal 824 includes a C-shaped cross-section; however other open cross-sections are usable according to the invention. FIG. 16 depicts an installed seal 824 showing a cutaway section view that includes mating portions of the crankcase 802, the cylinder head 822 and the compression sleeve 812. In the installed position, the seal open cross-section 828 is compressed between a bottom surface of the recess 825 and the head cover sealing surface 827 and the amount of compression is sufficient to ensure that sealing contact is make over the entire seal ring. The seal 824 seals the cylinder volume 820 to prevent high-pressure refrigeration gas from leaking between the mating faces of the crankcase 802 and the cylinder head 822. The recess 825 is formed to receive the seal therein and provides a depth that ensures compression of the seal cross-section. In conventional high pressure seals the open cross-section faces toward the high-pressure side of the seal, however, as described above any gas filling the open cross-section is unusable for refrigeration. According to the present invention, the seal 824 is formed with its open cross-section facing the toward the low-pressure side. This reduces dead space within the compression volume 820 and improves the cryocooler performance. In a comparative test between a conventional high-pressure seal with its open cross-section facing the high-pressure side and the improved seal described above, the cool down time of a test load was reduced by approximately 29% and the maximum cooling power obtained was increased by approximately 6%. Both of these improved results are attributable to reducing the dead space volume of the cylinder volume 820.

The seal 824 is formed from a flexible inconel metal substrate and over coated with a thin malleable metal layer that conforms to surface irregularities in surfaces that the seal contacts. In particular the malleable layer comprises a layer of silver-nickel metal alloy applied to a thickness of 0.06-0.12 mm, (0.002-0.004 inch). The malleable layer readily conforms to fill small irregularities in the surfaces contacting the seal. Similar improved high-pressure seal elements and installation configurations, as described above, are also used to seal the cryocooler regenerator cylinder.

Referring to FIGS. 14 and 17 an improved head cover 1300, according to the present invention, is shown in section view. The head cover 1300 comprises a raised circular head surface 1302 that mates with the cylinder bore 818 for forming an end face of the compression volume 820. Surrounding the head surface is the sealing surface 827 recessed below the head surface 1302. The sealing surface 827, contacts the crankcase 802 over its full extent, and compresses the seal 824 within the crankcase recess 826. The head cover 1300 attaches to the crankcase 802 with a plurality of threaded fasteners, not shown, to provide a high-pressure seal therewith. A head cover outer surface 1306 is formed to provide heat-dissipating properties for readily drawing thermal energy away from the compressor and radiating the thermal energy into the surrounding air. The outer surface 1306 includes a plurality of fin protrusions 1308, each formed to provide additional surface area, for radiating heat to the surrounding air. Each protrusion 1308 comprising a fin shaped element extending from a surface 1310 to a height of approximately 8.5 mm, (0.38 inches). Each protrusion 1308 has opposing sidewalls 1312 tapered at about 5° and a top wall 1314 having a width of approximately 1.0 mm, (0.04 inches). The head cover 1300 includes 14 such protrusions 1308 separated by a peak-to-peak spacing of approximately 3.5 mm, (0.14 inches). Each heat-dissipating fin 1308 serves to dissipate heat removed from the compression space. To further increase the surface area available for radiation, exposed surfaces of the outer surface 1306 are sandblasted to obtain a 125-350 micro inch surface texture finish. The head cover is formed from cast 6061-T6 aluminum and the surfaces 1302 and 827 are machines thereon in a secondary operation. The heat dissipating fins 1306 help to increase cooling capacity of the cryocooler and to increase the useful life of the compressor by reducing its normal operating temperature.

Flexible Vane Improvements

Figure 12:
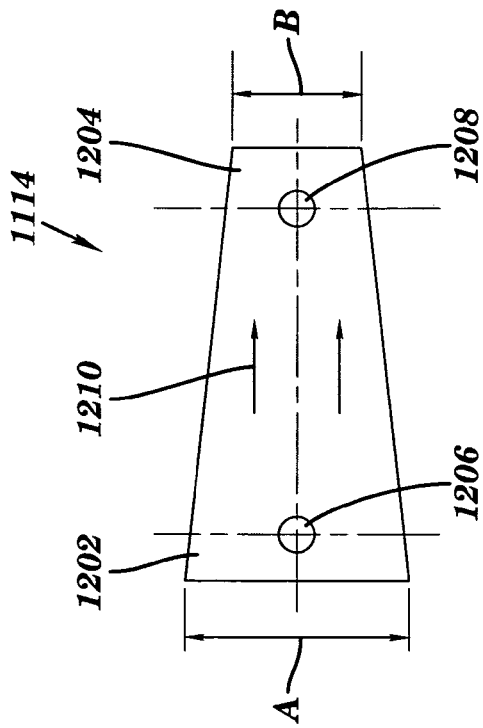
FIG. 12 illustrates a buckle resistant flexible vane according the present invention.

As shown in FIGS. 11 and 12 an improved flexible vane 1114 comprises a bendable leaf spring for providing the drive link between the drive coupler, attached to the DC motor crank pin, and the piston 1100. The improved flexible vane 1114 comprises a buckle resistant shape by providing a tapered width. The vane 1114 includes a wider driven end A having an edge width of approximately 5.8 mm, (0.23 inches) and a narrower drive end B with an edge width of approximately 4.3 mm, (0.17 inches). The driven end A connects to the drive coupling via a hole 1206 and the drive end B connects to the compression piston a hole 1208. Each end of the flexible vane 1114 is constrained by a clamping element and is unable to bend freely. As a result, bending stress is particularly high at the two ends where the vane is constrained from bending over a smooth radius. Accordingly, the vane is more likely to buckle at its ends and a buckle permanently damages the vane. The vane 1200 is formed from a 1095 blue temper steel substrate, with a uniform thickness of approximately 0.28 mm, (0.011 inches). In a preferred embodiment, the vane is formed by a chemical etch process to provide smooth defect free edges for eliminating stress concentration areas. The material grain is specifically oriented in the direction indicated by the arrows 1210 to ensure that bending occurs along an axis parallel with the grain. The vane 1114 resists buckling during operation by providing areas of increased stiffness where buckling is likely to occur. The increased stiffness resists buckling and causes bending to occur in less stiff portions of the vane. In particular, the driven end A of the vane constrained by the drive coupling is particularly susceptible to buckling when a piston stall occurs. In order to avoid buckling the van is made wider at the driven coupling end A and tapered in width toward the drive end B. In the event of a piston stall, the vane bends more readily at the thinner end, which is less stiff. This allows the vane to bend without buckling. In a specific example of the present invention the vane length is 14.6 mm dimension A is 5.8 mm and the dimension B is 4.3 mm such that the ratio of widths at the wide end to narrow end is 1.35. Of course, other vane shapes that increase stiffness at the driven end A, may also be used.

It will also be recognized by those skilled in the art that, while the invention has been described above in terms of preferred embodiments, it is not limited thereto. Various features and aspects of the above-described invention may be used individually or jointly. Further, although the invention has been described in the context of its implementation in a particular environment, and for particular applications, e.g. for use in miniature refrigeration units, those skilled in the art will recognize that its usefulness is not limited thereto and that the present invention can be beneficially utilized in any number of environments and implementations including but not limited to any brushless DC motor or any gas compressor, or any refrigeration device or combinations thereof. Accordingly, the claims set forth below should be construed in view of the full breadth and spirit of the invention as disclosed herein.

The invention claimed is:

1. A cryocooler system for cooling an element comprising:
   a refrigeration gas compressor having a crankcase for forming a compression cylinder, a compression piston supported to reciprocate within the compression cylinder and a cylinder head attached to the crankcase for sealing the compression cylinder;
   a rotary DC motor comprising a solid rotor shaft assembly coupled to the compression piston by a drive coupling wherein the rotor shaft assembly comprises a solid shaft portion, made substantially from a ferromagnetic material with a magnetic permeability from about 2000 to about 75000 as compared to vacuum and supported for rotation about a longitudinal rotation axis, a hollow tubular shaped flywheel mass disposed concentric with and radially distal from the rotation axis, a wall portion radially disposed between the shaft portion and the flywheel mass, wherein the shaft portion, the wall portion and the flywheel mass are integrally formed as a unitary element.

2. The cryocooler system of claim 1 wherein the ferromagnetic material comprises one of magnetically permeable series 400 stainless steel and low carbon steel.

3. The cryocooler system of claim 2 further comprising: an even number of permanent magnets attached directly to and rotatable with the solid shaft element.

4. The cryocooler system of claim 3 wherein the solid shaft portion further comprises a six-sided cross section formed substantially along most of its longitudinal length for providing six flat surfaces for supporting six permanent magnets thereon and wherein each flat surface is formed with its normal axis substantially perpendicular with the rotation axis.

5. The cryocooler system of claim 1 wherein the drive coupling comprises:
   a crank pin longitudinally extending out from a drive end of the sold shaft portion parallel with and offset from the rotation axis for eccentrically rotating about the rotation axis,
   a buckle resistant flexible vane forming a drive link connected between the crank pin at a driven end of the flexible vane and the compression piston at a drive end of the flexible vane for reciprocally driving the compression piston within the compression cylinder in response to eccentric rotation of the crank pin and wherein the buckle resistant flexible vane comprises
   a flexible steel substrate having a substantially uniform thickness and formed with the driven end wider than the drive end to increase the stiffness of the driven end with respect to the drive end.

6. The cryocooler system of claim 5 wherein the flexible steel substrate comprises 1095 blue tempered spring steel having a thickness of less than 0.5 mm, (0.02 inches).

7. The cryocooler system of claim 1, wherein the rotary DC motor further comprises a stator assembly and a plurality of permanent magnets attached to said rotor shaft.

8. The cryocooler system of claim 7, wherein the stator further comprises a continuous circumferential outer ring portion and a plurality of inwardly extending radial arms wound with wire coils and extending inwardly toward the rotor rotation axis and ending at an air gap.

9. The cryocooler system of claim 8, wherein said radial arms, said wire coils, and said air gap form an electromagnetic circuit.

10. A cryocooler system for cooling an element comprising:
    a refrigeration gas compressor having a crankcase for forming a compression cylinder, a compression piston supported to reciprocate within the compression cylinder and a cylinder head attached to the crankcase for sealing the compression cylinder;
    a rotary DC motor comprising a rotor shaft assembly coupled to the compression piston by a drive coupling wherein the rotor shaft assembly comprises a solid shaft portion supported for rotation about a longitudinal rotation axis, a hollow tubular shaped flywheel mass disposed concentric with and radially distal from the rotation axis, a wall portion radially disposed between the shaft portion and the flywheel mass, wherein the shaft portion, the wall portion and the flywheel mass are integrally formed as a unitary element, wherein the DC motor further comprises:
    a removable cover set formed by interlocking front and rear cup shaped hollow annular cover sections, with each cup shaped cover section having a closed end attached to the DC motor and an opposing opened end formed as one of an annular male and an annular female interlocking portion;
    a first adhesive bond layer disposed between the annular male and the annular female interlocking portions over their entire circumference for providing a pressure seal and for mechanically fastening the cover sections together; and,
    wherein the female interlocking portion includes a circumferential marking feature, visible from the outside of the DC motor, for marking a location for cutting through the female interlocking portion along the circumferential marking feature for making a motor repair.

11. The cryocooler system of claim 10 wherein the male interlocking portion includes a circumferential bonding recess formed thereon for receiving the bonding layer therein.

12. The cryocooler system of claim 10 wherein said circumferential marking feature, comprises a plurality of circumferential features for marking a plurality of locations for cutting through the circumferentially marked cover section to separate the cover sections a plurality of times.

13. The cryocooler system of claim 12 wherein said circumferential bonding recess comprises a plurality of circumferential bonding recesses formed on the male interlocking portion for receiving a new adhesive bond layer therein each time that the cover set is reassembled.

* * * * *